(12) United States Patent
Madrigal Villegas et al.

(10) Patent No.: US 9,512,031 B2
(45) Date of Patent: Dec. 6, 2016

(54) DIGITAL GLAZE FOR HIGH GRAMMAGE, WITHOUT THE USE OF ANTI-SETTLING AGENTS

(71) Applicant: TORRECID, S.A., Alcora (Castellón) (ES)

(72) Inventors: Jose Manuel Madrigal Villegas, Alcora (ES); Jorge Ribes Torner, Alcora (ES); Francisco Alejandro Tirado Francisco, Alcora (ES); Juan Vicente Corts Ripoll, Alcora (ES); Francisco Sanmiguel Roche, Alcora (ES)

(73) Assignee: TORRECID, S.A., Alcora (Castellon) (ES)

( * ) Notice: Subject to any disclaimer, the term of this patent is extended or adjusted under 35 U.S.C. 154(b) by 0 days.

(21) Appl. No.: 14/761,472

(22) PCT Filed: Dec. 18, 2013

(86) PCT No.: PCT/ES2013/070897
§ 371 (c)(1),
(2) Date: Jul. 16, 2015

(87) PCT Pub. No.: WO2014/111606
PCT Pub. Date: Jul. 24, 2014

(65) Prior Publication Data
US 2015/0353415 A1 Dec. 10, 2015

(30) Foreign Application Priority Data
Jan. 21, 2013 (ES) .................................. 201330061

(51) Int. Cl.
| | | |
|---|---|---|
| *C09D 11/00* | (2014.01) | |
| *C03C 8/00* | (2006.01) | |
| *C03C 8/16* | (2006.01) | |
| *C04B 41/86* | (2006.01) | |
| *C04B 41/00* | (2006.01) | |
| *C04B 41/50* | (2006.01) | |

(52) U.S. Cl.
CPC . *C03C 8/00* (2013.01); *C03C 8/16* (2013.01); *C04B 41/009* (2013.01); *C04B 41/5022* (2013.01); *C04B 41/86* (2013.01)

(58) Field of Classification Search
CPC ....... C09D 11/30; C09D 11/40; C09D 11/322; C09D 11/037

USPC ............ 106/31, 13, 31.6, 31.85, 31.89, 31.9
See application file for complete search history.

(56) References Cited

U.S. PATENT DOCUMENTS

| | | | | |
|---|---|---|---|---|
| 5,407,474 A | * | 4/1995 | Airey .................... | C09D 11/322 106/31.05 |
| 5,743,946 A | * | 4/1998 | Aoki ..................... | C09D 11/03 106/31.05 |
| 6,357,868 B1 | * | 3/2002 | Pfaff ...................... | B41M 3/12 347/100 |
| 7,803,221 B2 | * | 9/2010 | Magdassi ................. | B41J 3/28 106/31.6 |
| 7,948,585 B2 | * | 5/2011 | Ohtani .................. | C09D 11/322 349/106 |
| 2008/0210122 A1 | | 9/2008 | Magdassi et al. | |
| 2011/0088581 A1 | * | 4/2011 | Crespi ...................... | C03C 8/16 101/483 |

FOREIGN PATENT DOCUMENTS

| | | |
|---|---|---|
| ES | 2 386 267 A1 | 8/2012 |
| WO | 2005/052071 A1 | 6/2005 |
| WO | 2009/077579 A1 | 6/2009 |

OTHER PUBLICATIONS

International Search Report of PCT/ES2013/070897 dated Apr. 24, 2014 [PCT/ISA/210].

* cited by examiner

*Primary Examiner* — Noah Wiese
(74) *Attorney, Agent, or Firm* — Sughrue Mion, PLLC

(57) ABSTRACT

A digital glaze for high grammage, without the use of anti-settling agents, referred to as digital glazes for digital inkjet printing techniques to apply high grammage, maintaining the same aesthetic and technical characteristics obtained with traditional glazes and non-digital application techniques. No anti-settling agents are used in the composition to prevent the digital glaze from being thixotropic and creating problems in the inkjet printing. The composition includes at least one medium that is liquid at ambient temperature, formed by a mixture of water and polar solvents and/or solvents of medium to low polarity, having a percentage by weight of between 20 and 70% of the total weight of the digital glaze; and at least one mixture of ceramic raw materials and/or frits as a glaze-forming material, having a percentage by weight of between 30 and 80% of the total weight of the digital glaze.

18 Claims, No Drawings

DIGITAL GLAZE FOR HIGH GRAMMAGE, WITHOUT THE USE OF ANTI-SETTLING AGENTS

CROSS REFERENCE TO RELATED APPLICATIONS

This application is a National Stage of International Application No. PCT/ES2013/070897, filed Dec. 18, 2013, claiming priority based on Spanish Patent Application No. P201330061, filed Jan. 21, 2013, the contents of all of which are incorporated herein by reference in their entirety.

OBJECT OF THE INVENTION

The object of the present invention is a digital glaze suitable for being applied by means of digital inkjet printing techniques which allows high grammage to be applied, maintaining the same aesthetic and technical characteristics which are obtained with traditional glazes and non-digital application techniques.

DESCRIPTION OF THE PRIOR ART

The incorporation of digital inkjet printing technology as a method for decorating ceramic tiles has enabled an evolution in the type of product which is marketed, as well as a whole series of management, processing and product advantages which have contributed to maintaining the competitiveness of the ceramics sector in general. These digital systems for decorating are based on high resolution DOD technology (greater than 220 dpi) in which printheads are used which generate drops of dozens of picoliters at a frequency which, depending on the manufacturer of the printhead, oscillates between 5-30 KHz, the most well-known manufacturers of these types of printheads being the companies, Dimatix (Fujifilm), Xaar, Seiko, K&M or Ricoh amongst others.

Nowadays, an attempt is made to utilize the advantages which digital technology offers, not only for the decoration step, but also for the glazing of ceramic tiles, the tendency being to cover the entire surface of the tile by means of a mixture of two or more digital glazes, which provides new aesthetic effects of greater added value. In this sense and using the same high resolution DOD technology, in the Spanish patent application, P201231722, a series of glazes suitable for application using this type of technology are described, which focus on glazing large format ceramic tiles which require a relatively low quantity of glaze and a high resolution for achieving the required aesthetic effects.

When, due to the aesthetic and technical characteristics of the ceramic tiles, a larger quantity of glaze is required to be applied than high resolution DOD technology allows, it is necessary to use other techniques, also digital inkjet printing technique such as electrovalve systems or that described in the patent applications, EP1972450A2 and EP2085225A2. The size of the drops which these systems generate is many dozens of nanoliters, the frequency of discharge from the printhead is in the order of 1 KHz and the resolution approximately 50 dpi. Given this large size of the drops, the grammage which is achieved is much greater than those using high resolution DOD technology, reaching values which exceed a kilogram per square meter.

In the patent application ES 2 386 267 A1, digital inks/glazes are described for these types of inkjet printing systems, which have a liquid means which is based on a mixture of water and polar solvents and a solid part which is characterized, amongst other things, by the use of anti-settlement agents which are normally used in the formulation of traditional glazes that are applied by non-digital methods, such as the bell, disk, waterfall, etc. These anti-settling agents are different types of clays (montmorillonites, bentonites, etc.) and kaolins, although carbon black or colloidal oxides and hydroxides may also end up being used.

All of these are solids and do not dissolve in a liquid medium formed by water and polar solvents. Furthermore, all of these mainly interact with the molecules of the solvents which the liquid medium composes, without having a direct interaction with the solid particles of the glaze.

In the case of clays and kaolins, these materials incorporate the solvent molecules in their laminar structure. When the glaze is at rest or subjected to a low shear force ($Y<10^{s-1}$) the incorporation of the solvent molecules on the part of the clay or the kaolin causes the viscosity of the glaze to increase considerably, thereby achieving the anti-settling effect. Contrarily, when the glaze is subjected to a high shear force, the incorporated molecules are released, reducing the viscosity of the glaze. The glazes which have this behavior are commonly termed thixotropic glazes.

In the case of carbon black, the anti-settling action is due to its high specific surface, such that the molecules of the solvents which compose the liquid medium penetrate through the interstices of the black carbon particles and cause the increase of the viscosity as in the case of clays and kaolins, again providing thixotropic glazes.

In the case of colloidal oxides, the anti-settling effect is due to the fact that they create three-dimensional networks in which the solvent molecules are trapped, similarly causing that which happens in the previous cases, an increase of the viscosity when the glaze is at rest or subjected to low shear forces and a reduction of the viscosity as the shear force increases, again providing thixotropic glazes.

Normally this is an advantage when conventional techniques for applying glaze are used (bells, waterfalls, disks, sprays, etc.), since using said techniques, high viscosities are required (in some cases in the order of hundreds of cps) and the presence of a small amount of sedimentation is not critical since the glaze is under continuous agitation, generally very energetic and there do not exist small tubes, small orifices, small passage or three-dimensional filters, nooks, etc. which can become blocked by sedimentation problems of the glaze.

Contrarily, the use of digital thixotropic glazes such as those described in the patent application ES 2 386 267 A1 based on the use of anti-settling agents such as those previously mentioned, poses a serious problem when it is desired to use them in digital inkjet printing techniques to proceed with glazing or decorating ceramic media.

In the digital inkjet printing techniques, such as for example those described in the patent applications EP1972450A2 and EP2085225A2 or the systems based on electrovalves for being able to apply high grammage (greater than 200 g/m²), the digital glaze travels a closed circuit in which it is subjected to relatively low shear forces ($<10^{s-1}$), amongst other things in order to avoid the formation of bubbles which cause defects in the print drops. If the digital glaze is thixotropic, its viscosity at the time of being injected is greater than that required in the inkjet technique, therefore the drop does not form immediately, numerous impulses being necessary until finally beginning to inject, which causes the effect known as delay. This effect is translated into absences of glaze in the first moments of the printing, and given that using the digital systems, motifs are generally printed which do not cover the entire piece (images, geometric shapes, etc.), the printing process is continuously started and stopped, therefore the final result is a defective printing with numerous absences of glaze on the surface of the piece, which means that the printed piece does not comply with the minimum quality criteria required by the ceramics industry.

Therefore, in order to characterize a digital glaze from a rheological point of view, it is not sufficient to indicate the viscosity at the working temperature as mentioned in patent ES 2 386 267 A1, but it is necessary to express the viscosity as a function of the shear force since the case may arise where for high shear forces, the viscosity is suitable, but it is not the same for low shear forces, posing problems which make their industrial use unviable.

In addition, all the inkjet printing techniques are very demanding in terms of the stability of the digital glazes which are to be used, since there are numerous small tubes, small orifices, small passage and three-dimensional filters, nooks, etc. in which the glaze can become retained if it is not sufficiently stable, causing the corresponding blockages and printing problems.

An added difficulty when achieving perfectly stable digital glazes without the use of anti-settling agents, is the use of particles with relatively large sizes (D100<50 μm, compared to D100<1.2 μm which characterizes the digital glazes for high resolution DOD). The use of particles with D100<50 μm is essential in order to achieve a competitive process when high grammage (greater than 200 g/m$^2$) is required since the greater the size of the particle, the more economically expensive the process for preparing the digital glaze is.

There is also the need to achieve perfectly stable digital glazes without the use of anti-settling agents, the loss of weight of which through evaporation does not cause problems of drying up in the printhead.

In order to overcome the previously described drawbacks, there exists the need to provide perfectly stable digital glazes without the use of anti-settling agents with a value of loss of weight through evaporation lower than 5% and with a particle size of D100<50 μm for the digital glazing systems conceived to apply grammage greater than 200 g/m$^2$.

DESCRIPTION OF THE INVENTION

The digital glazes, object of the following invention, solve the drawbacks of the prior art previously described and are characterized by being constituted by a solid part and a liquid medium.

The solid part of the digital glaze, the percentage by weight of which is between 30 and 80% of the total weight of the digital glaze, is constituted by a mixture of ceramic raw materials, frits and in the cases in which a colored finish is desired, ceramic pigments, all of which are commonly used in the ceramic sector. The mixture and the percentage of each of these raw materials, frits and ceramic pigments, are defined as a function of the final finish which is desired to be provided to the glazed layer of the ceramic tile following the firing of the same (shiny transparent, shiny opaque, matte, luster, etc.). As ceramic raw materials, the following are used: frits, pigments, ceramics, sands, feldspars, aluminas, clays, zirconium silicates, zinc oxide, dolomite, kaolin, quartz, barium carbonate, mullite, wollastonite, tin oxide, nepheline, bismuth oxide, boracic products, colemanite, calcium carbonate, cerium oxide, cobalt oxide, copper oxide, iron oxide, aluminium phosphate, iron carbonate, manganese oxide, sodium fluoride, chrome oxide, strontium carbonate, lithium carbonate, spodumene, talc, magnesium oxide, cristobalite, rutile, anatase, bismuth vanadate, vanadium oxide, ammonium pentavanadate or a mixture thereof.

In order to prevent the digital glaze, object of the invention, being thixotropic and therefore having problems in the inkjet printing process, anti-settling agents are not used in the composition of the same, given that these are solid and are not soluble in the liquid medium which also forms part of the digital glaze.

The digital glazes, object of the present invention, are also characterized in that the solid part thereof has the following granulometric distribution:
=>D100<50 μm
=>D90<35 μm
=>D50<20 μm
=>D25<15 μm
=>D10<10 μm This is also the case in order to be industrially competitive, since going to smaller particle sizes would significantly drive up its preparation cost and therefore the end cost of the ceramic tile since these digital glazes are used in the majority of cases with high grammage, greater than 200 g/m$^2$. This high particle size, if compared with that of the digital glazes for high resolution DOD (D100<1.2 μm), adds an additional difficulty at the time of formulating stable glazes which function correctly during the printing process, therefore it is of great importance to suitably define the type and percentage of the solvents and agents which are going to form part of the liquid medium.

The liquid medium of the digital glazes, object of the present invention, the percentage by weight of which is between 20 and 70% of the total weight of the digital glaze, is formed by a mixture of water in a content of between 10% and 50% by weight and of polar solvents of medium to low polarity, also in a percentage of between 10% and 50% by weight.

Solvents which can be used are alcohols, fatty alcohols, aliphatic fatty alcohols, aromatic fatty alcohols, amines, octylamines, cyclic amines, hydrocarbonated solvents, naphthenic solvents, paraffinic solvents, aromatic derivatives such as diisopropylnaphthalene, glycols, polyglycols, esters, branched monoesters, oleic esters, benzoic esters, lactic acid esters, myristic acid esters, palmitic acid esters, fatty acid esters in general, propylene glycol acetates, dipropylene glycol ether acetate, polyethylene glycol acetates, diethylene glycol monobutyl ether acetate, glycol ethers, polypropylene glycols ethers, tripropylene glycol monomethyl ether, dipropylene glycol monopropyl ether, dipropylene glycol monobutyl ether, propylene glycol phenyl ether, tripropylene glycol monobutyl ether and polyethylene glycol ethers, hexyl carbitol ether, phenols, alkylphenols, fatty acids, terpene alcohols, terpene acids, copolymers of vinylpyrrolidone, polyglycols, polypropylene glycol or a mixture thereof.

Additionally, so as the digital glaze has the required stability and correct behavior during the printing process, soluble agents in the liquid medium are used, such as dispersants or stabilizers, binders, surfactants or humectants, rheological modifiers, anti-foaming agents and preservatives.

The dispersants or stabilizers prevent the agglomeration of the solid particles and are used in a percentage by weight lower than 8%, preferably lower than 5%. As dispersants or stabilizers the following can be used: derivatives of aromatic hydrocarbons, polyamides and phosphoric salts of polymers with acidic groups, polymeric dispersants, phosphates, phosphonates, acrylics, polymerics based on polyurethane, on polyesters or mixtures thereof.

The binding agents provide greater cohesion between the molecules of the solvents which form the liquid medium and the solid particles and in the cases in which they are used, they are used in a percentage lower than 5%, preferably lower than 3%. As binding agents, the following can be used: cellulosic derivatives, polyacrylamides, polyethylene glycols, polyurethanes, polyvinylpyrrolidones or a mixture thereof.

The surfactants or humectants modify the surface tension of the liquid medium and improve the moisture of the surface of the solid particles on the part of the solvent. The percentage of use thereof in the cases in which they are used is lower than 1%. As surfactants, the following can be used: fatty acids, alcohol alkoxylates, fatty alcohols, fluorinated surfactants, acrylic copolymers, EO/PO copolymers, esters, derivatives of sorbitol, derivatives of glycerol, derivatives of silicone or a mixture of the foregoing. All of which for the purpose of achieving a surface tension of between 30 and 50 dynes/cm.

The agents termed rheological modifiers make the mobility of the solid particles difficult, being used when they are required in a percentage lower than 2%. As rheological modifiers, the following can be used: acrylics, polyurethanes, smectites, hectorites, aluminosilicates, derivatives of urea, starches, celluloses, hexahydrated magnesium chloride, sodium chloride or a mixture thereof.

The anti-foaming agents prevent the formation of foam and in the cases in which they are required, they are used in a percentage lower than 1%. As anti-foaming agents, derivatives of polysiloxanes, derivatives of mineral oil, fatty derivatives or a mixture thereof can be used.

Lastly, agents which prevent the deterioration or the decomposition of the liquid medium can also be used, commonly termed bactericides, fungicides, preservatives or similar, being used in percentages lower than 1% in the cases in which they are required. As preservatives, the following can be used: isothiazolinones, carbendazims, bronopols or others.

With all the above, the digital glazes, object of the present invention, have a rheological behavior close to Newtonian, that is to say, the viscosity thereof is not modified to a large extent with shear force, characterized by the following values of viscosity as a function of the shear force:

=>Viscosity ($\mu$) lower than 50 cps for a shear force (y) of $10 \, s^{-1}$.

=>Viscosity ($\mu$) lower than 40 cps for a shear force (y) of $100 \, s^{-1}$.

=>Viscosity ($\mu$) lower than 40 cps for a shear force (y) of $1,000 \, s^{-1}$.

In turn, these digital glazes also have the advantage that they do not cause the blockage of filters or small tubes or orifices which are in the circuit of the printing device, since their sedimentation is very small, even when they are at rest.

Similarly, the digital glazes, object of the present invention, have the advantage that they do not dry in the printhead, with a value of loss of weight through evaporation lower than 5%. The method for measuring the loss of weight is based on the thermogravimetry technique (TG), the result being expressed in % by weight lost during 60 minutes, having been subjected to the sample at a constant temperature of 50° C. It was experimentally checked that with losses of weight greater than 5%, problems of drying up in the printhead begin to appear.

The digital glazes, object of the present invention, can also be used as inkjet inks applied on base glazes (applied in turn by any method) in order to achieve certain decorative effects not related to the color, such as the microrelief effect, gloss/matte contrast, luster effect, etc.

The digital glazes, object of the present invention, can also be used as inkjet inks applied at the end of the line of glazing, as a final application after the base glazing and the decoration with the purpose of providing protection.

PREFERRED FORMS OF EMBODIMENT

In order to complement the description and with the aim of aiding a better understanding of its characteristics, the present specification is accompanied by various exemplary embodiments of digital glazes to provide the final finish desired for the glazed layer, according to the invention.

All of the exemplary embodiments indicated are done so in an illustrative and non-limiting manner.

Digital Glaze which Provides a Shiny Transparent Effect

In the table shown below, four exemplary embodiments for digital glazes with a shiny transparent effect according to the invention are shown:

| COMPONENT | NATURE | SHINY TRANSPARENT GLAZES | | | |
|---|---|---|---|---|---|
| | | 1 % | 2 % | 3 % | 4 % |
| SOLVENT | WATER | 30-35 | 30-35 | 10-15 | 25-30 |
| SOLVENT | MONOETHYLENE GLYCOL | 30-35 | | 10-15 | 20-25 |
| SOLVENT | BUTYL DIGLYCOL | | 25-30 | | |
| DISPERSANT | PHOSPHATE | | | <3 | |
| DISPERSANT | SODIUM POLYACRYLATE | | <8 | | |
| DISPERSANT | POLYMERIC HYPERDISPERSANT | <5 | | | 2-5 |
| BINDER | CELLULOSIC DERIVATIVE | <5 | | | |
| BINDER | POLYACRYLAMIDE | | <3 | <2 | |
| SURFACTANT | ETHOXYLATED FATTY ALCOHOL | <1 | | | <1 |
| SURFACTANT | FLUOROCARBON POLYMER | | | <1 | |
| RHEOLOGICAL MODIFIER | POLYURETHANE | <2 | | | |
| RHEOLOGICAL MODIFIER | UREA DERIVATIVE | | | | <1 |
| ANTI-FOAMING AGENT | MINERAL OIL DERIVATIVE | <1 | <1 | | <1 |
| PRESERVATIVE | ISOTHIAZOLINONES | <1 | <1 | | |
| CERAMIC RAW MATERIAL | FRIT 1 | 25-30 | 25-30 | | |
| CERAMIC RAW MATERIAL | FRIT 2 | | | 70-75 | |
| CERAMIC RAW MATERIAL | FRIT 3 | | | | 45-50 |
| CERAMIC RAW MATERIAL | ALUMINA | 5-10 | 5-10 | <5 | 1-3 |

Digital Glaze which Provides an Opaque Shiny Effect

In the table shown below, an exemplary embodiment for digital glazes with an opaque shiny effect according to the invention is shown:

| COMPONENT | NATURE | OPAQUE SHINY GLAZE % |
|---|---|---|
| SOLVENT | WATER | 25-30 |
| SOLVENT | MONOETHYLENE GLYCOL | 20-25 |

-continued

|  |  | OPAQUE SHINY GLAZE |
|---|---|---|
| COMPONENT | NATURE | % |
| DISPERSANT | POLYMERIC HYPERDISPERSANT | 2-5 |
| SURFACTANT | ETHOXYLATED FATTY ALCOHOL | <1 |
| ANTI-FOAMING AGENT | MINERAL OIL DERIVATIVE | <1 |
| CERAMIC RAW MATERIAL | FRIT 6 | 45-50 |
| CERAMIC RAW MATERIAL | ALUMINA | 1-3 |

Digital Glaze which Provides a Luster Effect

In the table shown below, three exemplary embodiments for digital glazes with a luster effect according to the invention are shown:

|  |  | POLISH GLAZES | | |
|---|---|---|---|---|
| COMPONENT | NATURE | 1 % | 2 % | 3 % |
| SOLVENT | WATER | 25-30 | 45-50 | 10-15 |
| SOLVENT | MONOETHYLENE GLYCOL | 20-25 |  | 30-35 |
| SOLVENT | BUTYL DIGLYCOL |  |  | 10-15 |
| SOLVENT | PROPYLENE GLYCOL |  | 15-20 |  |
| DISPERSANT | PHOSPHATE |  | <3 |  |
| DISPERSANT | SODIUM POLYACRYLATE | <1 | <2 |  |
| DISPERSANT | POLYMERIC HYPERDISPERSANT | <5 |  | <4 |
| BINDER | CELLULOSIC DERIVATIVE | <1 | <3 | <2 |
| SURFACTANT | ETHOXYLATED FATTY ALCOHOL | <1 | <1 |  |
| ANTI-FOAMING AGENT | MINERAL OIL DERIVATIVE | <1 |  | <1 |
| PRESERVATIVE | ISOTHIAZOLINONES |  | <1 |  |
| CERAMIC RAW MATERIAL | FRIT 4 | 45-50 | 30-35 | 40-45 |

Digital Glaze which Provides a Matte Effect

In the table shown below, three exemplary embodiments for digital glazes with a matte effect according to the invention are shown:

|  |  | MATTE GLAZE | | |
|---|---|---|---|---|
| COMPONENT | NATURE | 1 % | 2 % | 3 % |
| SOLVENT | WATER | 25-30 | 25-30 | 25-30 |
| SOLVENT | MONOETHYLENE GLYCOL | 20-25 | 10-15 | 10-15 |
| SOLVENT | DIETHYLENE MONOBUTYL ETHER |  |  | 10-15 |
| SOLVENT | PROPYLENE GLYCOL |  | 10-15 |  |
| DISPERSANT | PHOSPHATE |  |  | <2 |
| DISPERSANT | SODIUM POLYACRYLATE |  | <3 | <1 |
| DISPERSANT | POLYMERIC HYPERDISPERSANT | <5 |  |  |
| BINDER | CELLULOSIC DERIVATIVE | <1 |  | <2 |
| BINDER | POLYACRYLAMIDE |  | <3 |  |
| SURFACTANT | ETHOXYLATED | <1 |  | <1 |

|  |  | MATTE GLAZE | | |
|---|---|---|---|---|
| COMPONENT | NATURE | 1 % | 2 % | 3 % |
| SURFACTANT | FATTY ALCOHOL FLUOROCARBON POLYMER |  | <1 |  |
| RHEOLOGICAL MODIFIER | POLYURETHANE | <1 |  |  |
| RHEOLOGICAL MODIFIER | UREA DERIVATIVE |  |  | <1 |
| ANTI-FOAMING AGENT | MINERAL OIL DERIVATIVE |  |  | <1 |
| PRESERVATIVE | ISOTHIAZOLINONES |  | <1 |  |
| CERAMIC RAW MATERIAL | FRIT 5 | 30-35 | 30-35 | 28-33 |
| CERAMIC RAW MATERIAL | SODIUM POTASSIUM FELDSPAR | 5-8 | 5-8 | 4-7 |
| CERAMIC RAW MATERIAL | CALCIUM SILICATE | 3-5 | 3-5 | 2-4 |
| CERAMIC RAW MATERIAL | ALUMINIUM SILICATE | 5-8 | 5-8 | 4-7 |
| CERAMIC RAW MATERIAL | COBALT SPINEL |  |  | 4-6 |

The preparation of the digital glazes with the indicated effects is carried out by means of the conventional methods generally used in the industry.

The main components of the frits used in the exemplary embodiments previously described are shown in the following table:

| FRITS | Main components |
|---|---|
| FRIT 1 | $SiO_2$, $CaO$ and $ZnO$ |
| FRIT 2 | $SiO_2$, $CaO$, $ZnO$ and $Al_2O_3$ |
| FRIT 3 | $SiO_2$, $CaO$, $ZnO$, $K_2O$ and $Al_2O_3$ |
| FRIT 4 | $SiO_2$, $B_2O_3$, $CaO$, $ZnO$, $K_2O$, $CeO_2$, $Z_rO_2$ and $Al_2O_3$ |
| FRIT 5 | $SiO_2$, $CaO$, $ZnO$, $K_2O$, $BaO$ and $Al_2O_3$ |
| FRIT 6 | $SiO_2$, $CaO$, $Z_rO_2$, $ZnO$, $K_2O$ and $Al_2O_3$ |

The invention claimed is:

1. A composition of digital glaze for digital inkjet printing techniques to apply high grammage, comprising:
   at least one medium which is liquid at ambient temperature, without anti-settling agents and formed by a mixture of water and polar solvents, the percentage by weight of which is between 20 and 70% of the total weight of the digital glaze,
   at least one solid part which is a mixture of frits and/or ceramic raw materials, the percentage by weight of which is between 30 and 80% of the total weight of the digital glaze,
   at least one soluble agent in the liquid medium, from among dispersants or stabilizers, binders, surfactants or humectants, rheological modifiers, anti-foaming agents and preservatives; and
   the composition of digital glaze having a viscosity as a function of the shear force as follows:
   viscosity lower than 50 cps for a shear force of $10\ s^{-1}$,
   viscosity ($\mu$) lower than 40 cps for a shear force (y) of $100\ s^{-1}$, and
   viscosity ($\mu$) lower than 40 cps for a shear force (y) of $1,000\ s^{-1}$; and
   wherein the at least one solid part has the following granulometric distribution:
   D100<50 μm, D90<35 μm,
D50<25 μm,
D25<15 μm,
D10<10 μm.

2. The composition of digital glaze for high grammage according to claim 1, wherein the mixture of frits and/or ceramic raw materials comprises ceramic pigments for providing color to the glaze.

3. The composition of digital glaze for high grammage according to claim 1, wherein the mixture of frits and/or ceramic raw materials are sands, feldspars, aluminas, clays, zirconium silicate, zinc oxide, dolomite, kaolin, quartz, barium carbonate, mullite, wollastonite, tin oxide, nepheline, bismuth oxide, boracic products, colemanite, calcium carbonate, cerium oxide, cobalt oxide, copper oxide, iron oxide, aluminium phosphate, iron carbonate, manganese oxide, sodium fluoride, chrome oxide, strontium carbonate, lithium carbonate, spodumene, talc, magnesium oxide, cristobalite, rutile, anatase, bismuth vanadate, vanadium oxide, or ammonium pentavanadate or a mixture thereof.

4. The composition of digital glaze for high grammage according to claim 1, wherein the water in the liquid medium is between 10 and 50% of the total weight of the digital glaze.

5. The composition of digital glaze for high grammage according to claim 1, wherein the one or more polar solvents of the liquid medium is between 10 and 50% of the total weight of the digital glaze.

6. The composition of digital glaze for high grammage according to claim 4, wherein the one or more polar solvents are alcohols, fatty alcohols, aliphatic fatty alcohols, aromatic fatty alcohols, amines, octylamines, cyclic amines, hydrocarbonated solvents, naphthenic solvents, paraffinic solvents, aromatic derivatives such as diisopropylnaphthalene, glycols, polyglycols, esters, branched monoesters, oleic esters, benzoic esters, lactic acid esters, myristic acid esters, palmitic acid esters, fatty acid esters in general, propylene glycol acetates, dipropylene glycol ether acetate, polyethylene glycol acetates, diethylene glycol monobutyl ether acetate, glycol ethers, polypropylene glycols ethers, tripropylene glycol monomethyl ether, dipropylene glycol monopropyl ether, dipropylene glycol monobutyl ether, propylene glycol phenyl ether, tripropylene glycol monobutyl ether and polyethylene glycol ethers, hexyl carbitol ether, phenols, alkylphenols, fatty acids, terpene alcohols, terpene acids, copolymers of vinylpyrrolidone, polyglycols, or polypropylene glycol or mixtures thereof.

7. The composition of digital glaze for high grammage according to claim 1, wherein the dispersants or stabilizers are used in a percentage by weight lower than 8% of the total weight of the digital glaze.

8. The composition of digital glaze for high grammage according to claim 1, wherein the binding agents are used in a percentage lower than 5% of the total weight of the digital glaze.

9. The composition of digital glaze for high grammage according to claim 1, wherein the surfactants or humectants are used in a percentage lower than 1% of the total weight of the digital glaze.

10. The composition of digital glaze for high grammage according to claim 1, wherein the liquid medium contains rheological modifiers in a percentage lower than 2% of the total weight of the digital glaze.

11. The composition of digital glaze for high grammage according to claim 1, wherein the anti-foaming agents are used in a percentage lower than 1% of the total weight of the digital glaze.

12. The composition of digital glaze for high grammage according to claim 1, wherein the liquid medium contains preservatives of the bactericide, fungicide type or similar and the percentage is lower than 1% of the total weight of the digital glaze.

13. The composition of digital glaze for high grammage according to claim 1, which can also be used as inkjet ink applied on base glazes in order to achieve certain decorative effects not related to the color.

14. The composition of digital glaze for high grammage according to claim 1, which can also be used as inkjet ink applied at the end of the line of glazing, as a final application after the base glazing and the decoration with the purpose of providing protection.

15. The composition of digital glaze for high grammage according to claim 1, which can also be used as inkjet ink applied on base glazes in order to achieve certain decorative effects not related to the color, including at least one of the microrelief effect, gloss/matte contrast, or luster effect.

16. The composition of digital glaze for high grammage according to claim 1, wherein the mixture of frits and/or ceramic raw materials is a glaze-forming material.

17. The composition of digital glaze for high grammage according to claim 1, wherein the dispersants or stabilizers are used in a percentage by weight lower than 5% of the total weight of the digital glaze.

18. The composition of digital glaze for high grammage according to claim 1, wherein the binding agents are used in a percentage lower than 3% of the total weight of the digital glaze.

* * * * *